United States Patent [19]

McFarlane et al.

[11] Patent Number: 5,107,918

[45] Date of Patent: Apr. 28, 1992

[54] ELECTRONIC THERMOSTAT

[75] Inventors: William McFarlane, Eagleville; Steven E. Williams, Murfreesboro; Robert C. Beilfuss, Smyrna, all of Tenn.

[73] Assignee: Lennox Industries Inc., Richardson, Tex.

[21] Appl. No.: 663,415

[22] Filed: Mar. 1, 1991

[51] Int. Cl.$^5$ .............................................. F23N 5/20
[52] U.S. Cl. .................................. 165/12; 236/46 R
[58] Field of Search ................. 236/46 R, 47; 165/12; 364/557

[56] References Cited

U.S. PATENT DOCUMENTS 4,264,034  4/1981  Hyltin et al. ...................... 236/46 R

FOREIGN PATENT DOCUMENTS

2225654  6/1990  United Kingdom .................. 165/12

Primary Examiner—William E. Wayner
Attorney, Agent, or Firm—Allegretti & Witcoff

[57] ABSTRACT

Apparatus and method useful in temperature control system for a predetermined area that employs a user friendly electronic thermostat that can be programmed intuitively and which is impossible to incorrectly program. Further, the electronic thermostat needs no periodic maintenance checks because it employs a super capacitor to supply electrical energy to memory if power is temporarily lost. A large display means is responsive to the operator's programming as the programming is being performed, in addition to other times.

20 Claims, 6 Drawing Sheets

Fig. 6

Fig.7
OUTDOOR SENSOR MODULE

ELECTRONIC THERMOSTAT

FIELD OF THE INVENTION

This invention relates to a device for controlling the temperature of a predetermined area, and more particularly, to an electronic thermostat which can be intuitively operated to control the temperature in a predetermined area and to a method of efficiently controlling the temperature utilizing the electronic thermostat.

BACKGROUND OF THE INVENTION

A thermostat can be used, as part of a temperature control system, to control heating units and air conditioning units. The electronic thermostat of the present invention accommodates heating units and air conditioning units in order to maintain comfort and economy levels of a predetermined area.

Known electronic thermostats have a day set temperature for heating, e.g., 70 degrees Fahrenheit, a night set back temperature for heating, e.g., 62 degrees Fahrenheit, an actual time readout, a time for set back to start, a time for set back to end, and overrides to raise or lower temperature as desired.

Known electronic thermostats also have a day set temperature for cooling, e.g., 72 degrees Fahrenheit, and a night set back temperature for cooling, e.g., 76 degrees Fahrenheit. A switch, which controls the operation of a fan, may be set on "ON" for continuous operation or on "AUTO" for automatic (cyclical) operation. Further, the thermostat has a "OFF"/"HEAT"/-"COOL"/"AUTO" switch (system state switch).

For heating, the system state switch is set to "HEAT." For cooling, the system state switch is set to "COOL."

Sometimes, such as in the spring or fall seasons, one may desire to control both the air conditioner and furnace with the thermostat due to the wide range of outside temperatures that may occur during these times. This can be done by setting the system state switch to "AUTO." In this state, the thermostat can turn on the air conditioner on a hot spring day and then turn on the furnace that night as it gets cooler. This enables the operator to keep an area within a desired range of temperatures. The present invention functions similarly. A thermostat is a device which is capable of keeping a predetermined area within a range of preselected temperatures when the device is coupled to both an air conditioning unit and a heating unit. The electronic thermostat controls the state (i.e. on or off) of both the air conditioning unit and the heating unit in order to keep a predetermined area within a range of preselected temperatures. Essentially, if the temperature is greater than the maximum preselected temperature one desires, the electronic thermostat turns on the air conditioning unit. On the other hand, if the temperature is less than the minimum preselected temperature one desires, the electronic thermostat turns on the heating unit.

Currently, thermostats are provided which require programming for a variety of operating modes. Programming is often difficult, especially for the elderly who are less apt to be familiar with electronic gadgetry. For instance, a programming error can result by attempting to set the maximum desirable temperature lower than the minimum desireable temperature. If this programming error were allowed to go undetected, the electronic thermostat would seek to turn on both the heating unit and the air conditioning unit, wasting a great amount of energy. Previous electronic thermostats deal with this programming error by taking this possible error into account in their software, hardware and/or "firmware." However, even if the electronic thermostat executes a program which prevents turning on both the air conditioning and heating units, in addition to warning the operator of the error, the operator is still forced to reprogram the electronic thermostat, wasting valuable time. Further, until the operator recognizes the warning, the predetermined area may not be heated or cooled, resulting in discomfort or even damage to the predetermined area if the operator is not present. Therefore, it is much more desireable to have an electronic thermostat which is impossible to incorrectly program.

Prior to the present invention, electronic thermostats also required maintenance in the form of periodically checking and/or replacing batteries to ensure the electronic thermostat will function in the event of a power failure. However, the present invention requires no periodic maintenance because a super capacitor is used to retain the memory of the electronic thermostat in the event of a temporary power failure. Also, known electronic thermostats require the operator to remember to check and/or replace a filter, increasing the efficiency of air flow and energy use. However, the present invention flashes the words "CHECK FILTER" once a fan has accumulated a predetermined running time. for example 360 hours or more of running time. Further, known electronic thermostats could not display the local (outdoor) temperature and the high and low local temperatures of the day. Lastly, known electronic thermostats do not contain diagnostic information for the furnace and compressors within the unit itself.

Accordingly, it is an object of the present invention to provide an electronic thermostat which can be programmed simply and intuitively by almost any user. Another object of the present invention is to provide an electronic thermostat which is "user friendly" to the operator, especially elderly operators (i.e., the group of people who are home most often and need to adjust their thermostats most frequently).

Still another object of the present invention is to provide notification to the operator to check for a dirty filter when the fan has accumulated a predetermined running time.

A further object of the present invention is to provide a structure for providing the current outside temperature, and the high and low temperature of the day.

Yet a further object of the present invention is to provide a structure and a method for easily displaying diagnostic information on a temperature control system.

Yet another object of the present invention is to provide an electronic thermostat capable of storing preselected temperatures, in addition to other information, in its memory in the event of a power failure for a preselected period of time, without requiring periodic maintenance.

A further object of the present invention is to provide an electronic thermostat capable of simultaneously displaying the maximum and minimum temperatures for both the first and second time intervals, in addition to other information, with the simple touch of a button.

Still another object of the present invention is to provide an electronic thermostat which includes intuitively operated slides for setting control temperatures for both day and night set back operation.

Another object of the present invention is to provide an electronic thermostat with a digital readout enlarged in a scale that eliminates the need for "back lighting" the display, which is commonly done on known electronic thermostats with smaller displays to facilitate their viewing in dimly lit areas, for example hallways.

Another object of the present invention is to provide a simple means to change from day to night operation by pressing a button having an integral LED that glows during night operation, whereby the glowing LED makes it easy to locate this button and effect the change in dimly lit areas, for example hallways.

Another object of the present invention is to provide an electronic thermostat with a digital readout coordinated with slide controls for easily setting the temperature operating program for both day and night operation.

A further object of the present invention is to provide a thermostat cover that can be manipulated to display, in addition to other information, the settings of the first pair of slide means, the second pair of slide means, the third pair of slide means, and the current temperature.

Yet another object of the present invention is to provide a method for intuitively and simply controlling the temperature of a predetermined area via an electronic thermostat.

Other objects and advantages of this invention will become apparent hereinafter.

SUMMARY OF THE INVENTION

Predetermined areas, such as a house, a room in a house, an office, or an entire building, can have their temperature controlled as desired by correctly programming an electronic thermostat. The difficulty in programming conventional thermostats can be greatly diminished, if not entirely eliminated, by providing an electronic thermostat which is both intuitive to program and user friedly.

According to a preferred form of the invention, the electronic thermostat functions to keep the predetermined area at a temperature between a first maximum temperature and a first minimum temperature during the daytime, and a second maximum temperature and a second minimum temperature during the nighttime. In the daytime, or first time interval, a first pair of slide means can be used to set the first maximum temperature and the first minimum temperature. In the nighttime, or second time interval, a second pair of slide means can be used to set the second maximum temperature and the second minimum temperature. A third pair of slide means can be used to set the beginning time and the ending time of the second time interval. Because there are only two time intervals, this third pair of slide means essentially sets the beginning time and the ending time of the first time interval also.

In the "AUTO" setting, during the first time interval the temperature of the predetermined area is maintained between the first maximum temperature and the first minimum temperature. During the second time interval, the temperature of the predetermined area is maintained between the second maximum temperature and the second minimum temperature. Override means are available which enable the temperature of the predetermined area to be maintained between the first maximum temperature and the first minimum temperature during the second time interval and between the second maximum temperature and the second minimum temperature during the first time interval by merely depressing an illuminated button. Thus, even if the operator wakes up during the middle of the night and cannot go back to sleep, the illuminated button is easy to find and enables the operator, for instance, to have the predetermined area maintained in the generally more comfortable range between the first maximum temperature and first minimum temperature during his or her waking hours.

Additionally, the present invention is easy to maintain and program in other respects. A one farad super capacitor stores energy which is capable of maintaining the current time, the number of hours of operation of the unit, and the maximum and minimum temperature of the day, in addition to other information, in the event of a power loss. Even though the display of the electronic thermostat goes blank, the super capacitor enables the electronic thermostat to store this information in memory for up to 24 hours. If power is restored prior to 24 hours elapsing, there is no need to reprogram the electronic thermostat. Additionally, because a super capacitor is used (as opposed to other electronic thermostats which use batteries to store information in the event of a power failure), the operator need not periodically check the electronic thermostat to see if the batteries are still operable. Additionally, the present invention allows the operator to review all minimum temperatures, all maximum temperatures, and the beginning and ending times of the second time interval by simply depressing a thermostat cover.

The present invention offers a number of advantages over prior electronic thermostats. First, the electronic thermostat of the present invention greatly diminishes, if not totally eliminates, the chance of a programming error. Second, the present invention is intuitive to program and user friendly. Third, the present invention is essentially maintenance free as it does not require checking and/or replacing batteries. Fourth, the present invention allows one to display the current local (outdoor) temperature in addition to the high and low outdoor temperature of the day. Lastly, diagnostic information on components of the heating and cooling systems can be displayed on a display means of the electronic thermostat. By using the present electronic thermostat, the temperature of a predetermined area can be efficiently controlled with ease unattainable by the prior art.

BRIEF DESCRIPTION OF THE DRAWINGS

These and other objects, advantages and features of the invention will hereafter appear for purposes of illustration, but not of limitation, in connection with the accompanying drawings in which like numbers refer to like parts throughout and in which.

DETAILED DESCRIPTION OF THE PREFERRED EMBODIMENT

Figure 1:
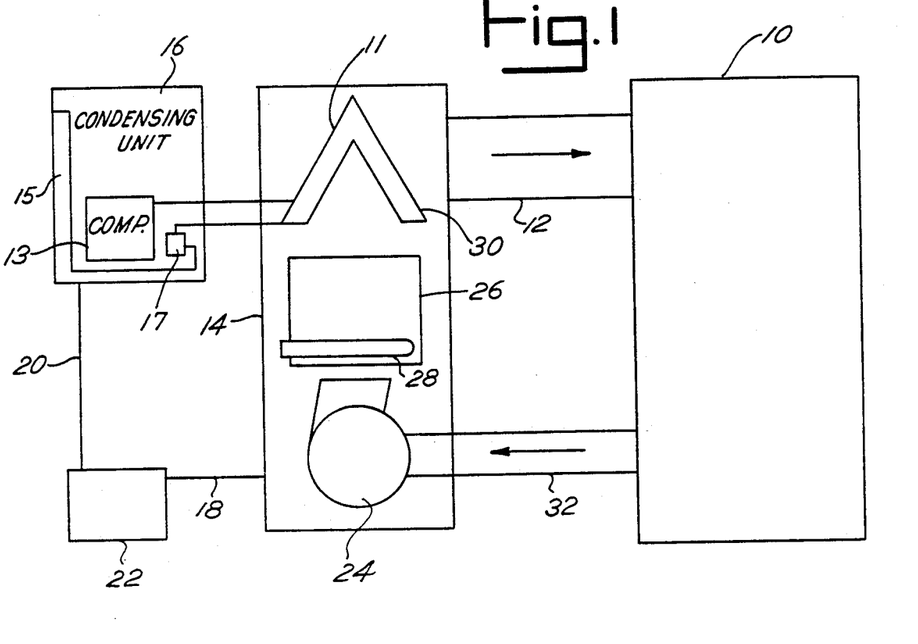
FIG. 1 is a schematic block diagram of a temperature control system.

Referring to FIG. 1, the temperature of a predetermined area 10 to be conditioned is maintained by forcing warm air or cold air into it via duct 12 and heating unit 14 or duct 12 and air conditioning unit 16, respectively. As illustrated, the heating unit 14 may be, for example, a conventional gas fired, oil fired or electric furnace. The air conditioning unit 16 includes a refrigeration system comprising an evaporator coil 11, which sits in the duct 12 above the heating unit 14, a typical compressor 13, condenser coil 15, and expansion means 17. The heating unit 14 and air conditioning unit 16 are responsive to electrical control lines 18 and 20, respectively, which emanate from the electronic thermostat 22. When the temperature of the predetermined area 10 is less than the minimum temperature desired, the electronic thermostat 22 sends a signal to the heating unit 14 via electrical control line 18, turning on the heating unit 14 and forcing warm air through duct 12 into the predetermined area 10 until the desired minimum temperature is attained. If the predetermined area 10 is at a higher temperature than the maximum temperature desired, electronic thermostat 22 sends a signal to air conditioning unit 16 via electrical control line 20 which forces cool air into the predetermined area 10 via duct 12 until the desired maximum temperature is attained.

The heating unit 14, or furnace, includes a fan 24, heat exchanger 26 with burners 28 and the normal controls. The furnace 14 is connected to the predetermined area 10 by two ducts, a duct 12 for supplying air to the predetermined area 10 and a return duct 32 for returning air from the predetermined area 10.

Figure 2:
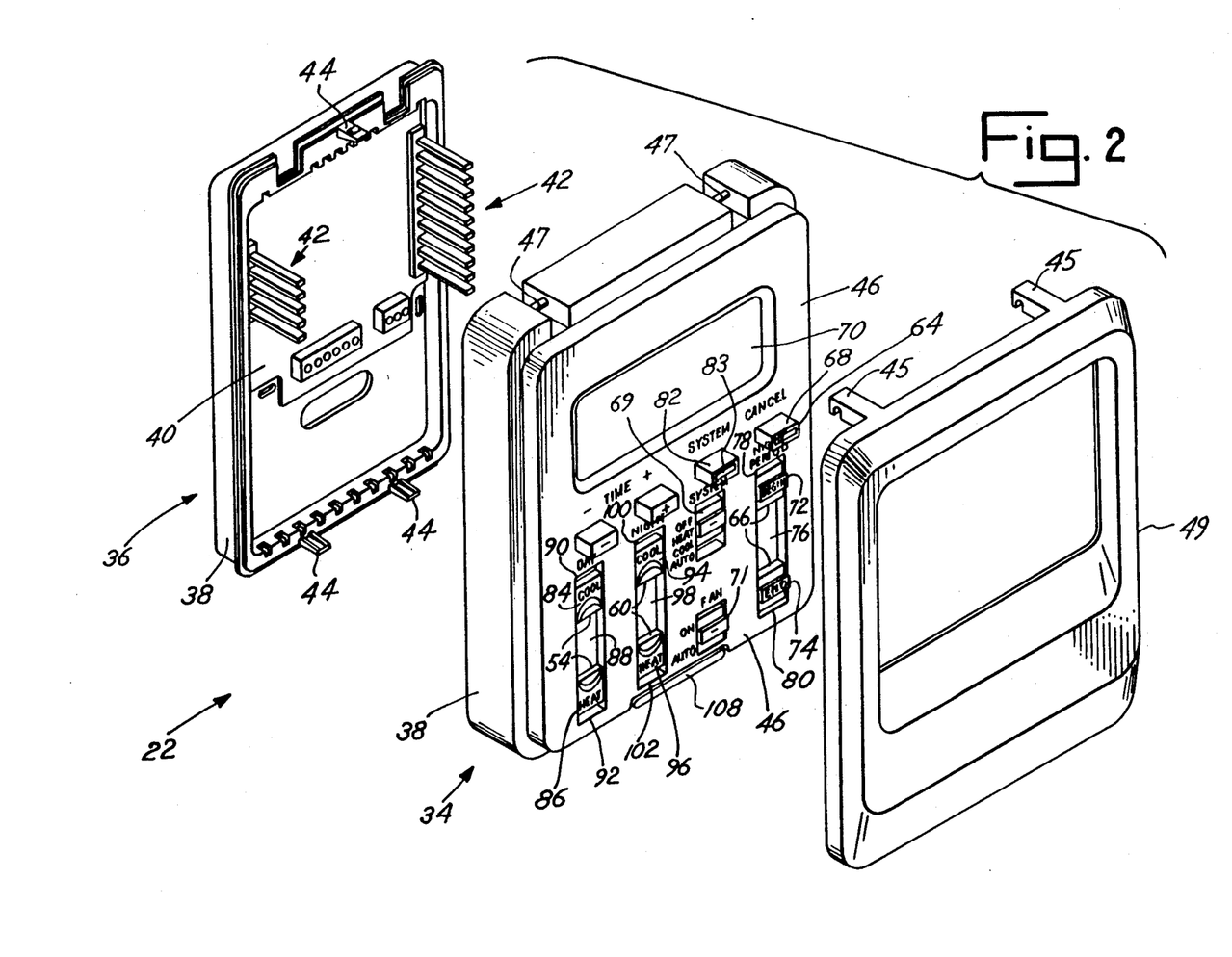
FIG. 2 is a perspective view of a preferred form of an electronic thermostat made in accordance with the present invention.
Figure 3:
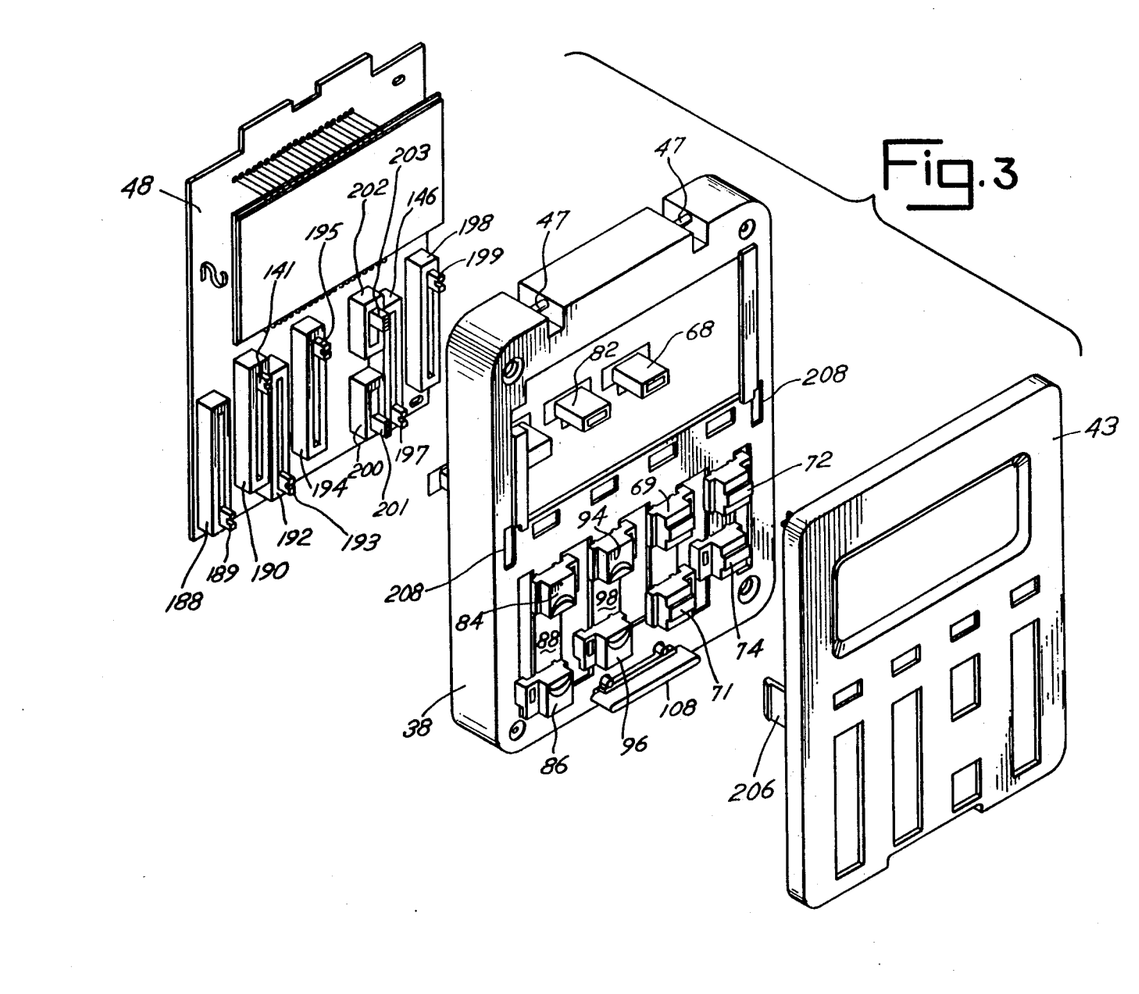
FIG. 3 is an exploded perspective view showing a more detailed preferred form of the electronic thermostat made in accordance with the present invention.
Figure 4:
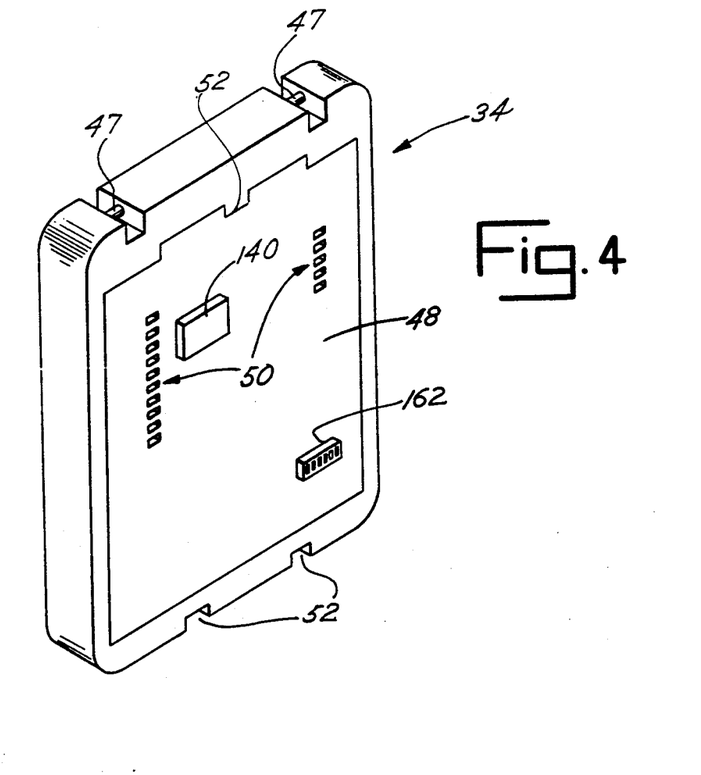
FIG. 4 is a perspective rear view of the thermostat portion of an electronic thermostat made in accordance with the present invention.

Referring to FIGS. 2 through 4, the electronic thermostat 22 is comprised of a thermostat 34 and a subbase 36, both of which are contained in a housing means 38. The subbase 36 is further comprised of a subbase printed circuit board 40, a first means 42 for electrical communication, and a first means 44 for mechanical coupling, all connected as shown. The subbase 36 also has a plurality of guides 37 to facilitate installation of the thermostat 34 onto the subbase 36. The thermostat 34 further comprises a control panel 46, a main thermostat board 48 (see FIG. 4), a thermostat cover 49, a second means 50 for electrical communication (see FIG. 4), and a second means 52 for mechanical coupling (see FIG. 4) all interconnected as shown in FIG. 2 through FIG. 4. The first means 42 and the second means 50 preferably comprise complementary interengaging male and female members. The thermostat cover 49 has two grooved prongs 45 which, in conjunction with the two grooved prong acceptors 47 of the housing means 38, serve to rotatably attach the thermostat cover 49 to the housing means 38.

Referring to FIG. 2, the control panel 46 is further comprised of a first pair of slide means 54, a second pair of slide means 60, a third pair of slide means 66, an override means 68, and a display means 70 (preferably an LCD model 4878-313-433 manufactured by Hamlin), all arranged as shown. The control panel is also comprised of a fan switch 71 which places the fan 24 (see FIG. 1) in an "ON" state or an "AUTO" state. Simply by viewing the labeled control panel 46, the electronic thermostat 22 can be programmed by using one's intuition. However, an explanation is provided.

One can deduce that a 24 hour day or period is broken down into two smaller periods, a day period (or first time interval) and a night period (or second time interval). Once the night period is determined, the day period automatically becomes the remainder of the 24 hour period. The third pair of slide means 66 determines the beginning time and ending time of the night period. The third pair of slide means 66 is comprised of a first slide 72, an second slide 74, a third path 76 having a first end 78 and a second end 80, the first slide 72 being closer than the second slide 74 to the first end 78 of the third path 76 at all times. Simply sliding the first slide 72 towards the first end 78 or towards the second end 80 adjusts the beginning time of the night period to an earlier or later setting, respectively. Likewise, simply sliding the second slide 74 towards the first end 78 or towards the second end 80 adjusts the ending time of the night period to an earlier or later setting, respectively. Also, as the beginning time and ending time are adjusted, the LCD 70 tracks and displays the changing time in increments of fifteen minutes in order to alert the operator that the desired beginning and ending times have been reached.

After differentiating between the night period and the day period, the operator sets the first maximum temperature and first minimum temperature via the first pair of slide means 54. Then, the operator sets the second maximum temperature and the second minimum temperature via the second pair of slide means 60. Although normally the first pair of slide means 54 will control the temperature during the day period and the second pair of slide means will control the temperature during the night period, these functions can be reversed simply by depressing the override means 68 (i.e., the CANCEL button). The electronic thermostat 22 will resume normal operation by depressing the override means 68 a second time. In other words, toggling the override means 68 changes the pair of slide means that is currently controlling the temperature of the predetermined area 10. The override means is illuminated by and LED 64 integral to the override means 68 only when the temperature is being controlled by the second pair of slide means (e.g., it is either the night time or the override means was depressed so that the night time settings are used to control the temperature during the day). The "SYSTEM" button 82 is illuminated by an integral LED 83 if the air conditioning unit 16 or the furnace 14 is in operation.

The first pair of slide means 54 is further comprised of a first slide 84, a second slide 86, and a first path 88 having a first end 90 and a second end 92, the first slide 84 being closer than the second slide 86 to the first end 90 of the first path 88 at all times. Simply sliding the first slide 84 towards the first end 90 or towards the second end 92 raises or lowers, respectively, the first maximum temperature. Likewise, sliding the second slide 86 towards the first end 90 or towards the second end 92 raises or lowers, respectively, the first minimum temperature.

The second pair of slide means 60 is further comprised of a first slide 94, a second slide 96, and a second path 98 having a first end 100 and a second end 102, the first slide 94 being closer than the second slide 96 to the first end 100 of the second path 98 at all times. Simply sliding the first slide 94 towards the first end 100 or towards the second end 102 raises or lowers, respectively, the second maximum temperature. Likewise, sliding the second slide 96 towards the first end 100 or towards the second end 102 raises or lowers, respectively, the second minimum temperature. An instantaneous readout is displayed on a display means 70 in response to sliding slides 84, 86, 94, 96, 72 and 74. The operator can set the temperatures for the air conditioning unit. The first slide 84 can be actuated to set a day control temperature, e.g., 70 degrees Fahrenheit, for the air conditioning unit. Another first slide 94 can be actuated to set a night control temperature, e.g., 74 degrees Fahrenheit, for the air conditioning unit. Next, the operator can set the temperatures for the furnace (heating unit). The second slide 86 can be actuated to set a day control temperature, e.g., 68 degrees Fahrenheit, for the heating unit. Another second slide 96 can be actuated to set a night control temperature, e.g., 62 degrees Fahrenheit, for the heating unit. Finally, the operator can set the start and stop times for the night period. A first slide 72 sets the beginning time for the night period, e.g., midnight. A second slide 74 sets the ending time for the night period, e.g., 6:30 a.m. Basically, the operator is reducing the energy needed to heat or cool the predetermined area 10 by programming desired temperatures to be cooler at night in the winter and warmer at night in the summer.

Figure 5:
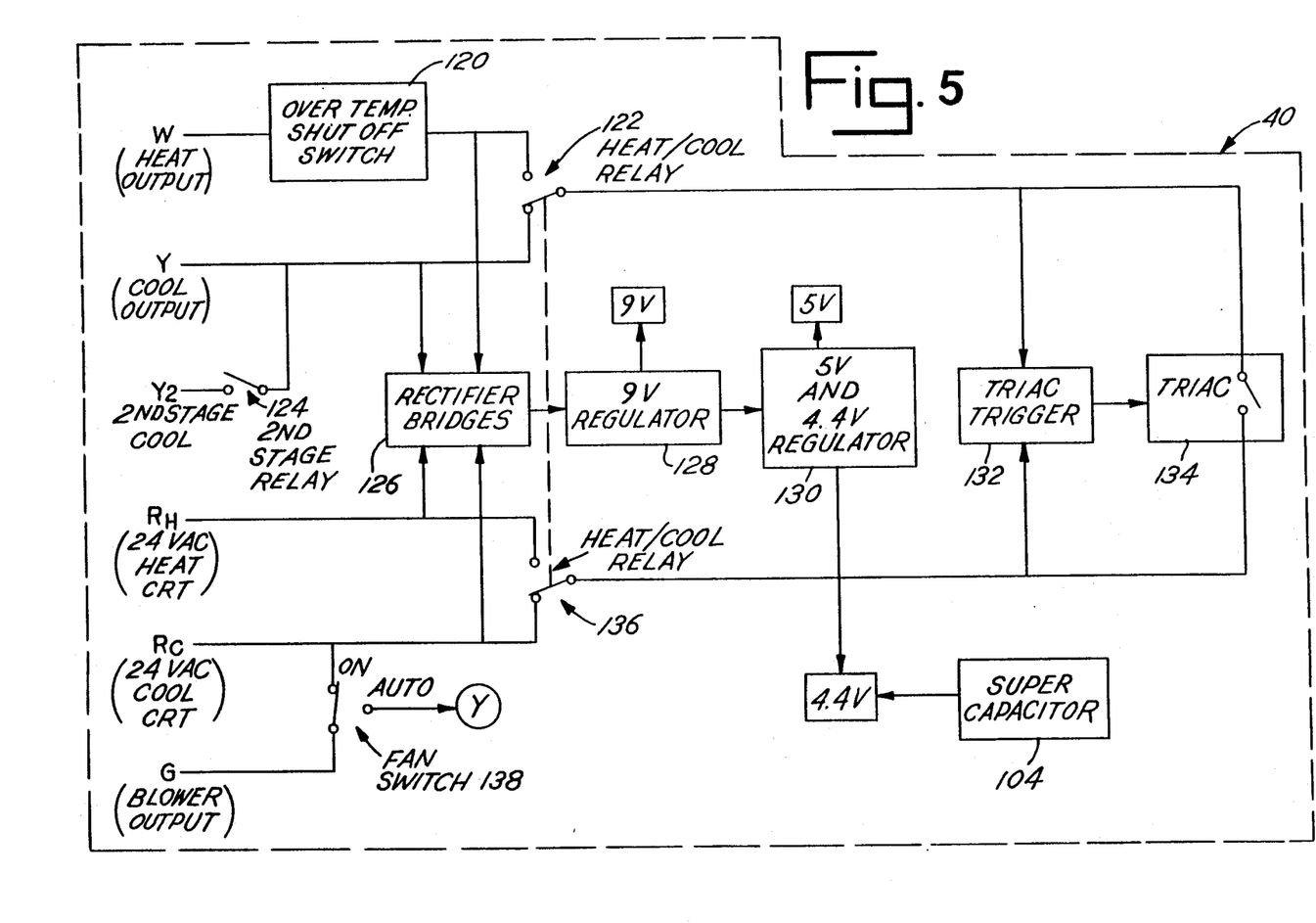
FIG. 5 is a schematic block diagram of a subbase printed circuit board of the electronic thermostat made in accordance with the present invention.

In the event of a power failure, the subbase printed circuit board 40 has a super capacitor 104 connected as shown in FIG. 5, preferably a 1.0 farad 5.5 volt super capacitor model number EEC-F5R5U105 manufactured by Panasonic, which supplies energy for the microcomputer's memory. The energy is supplied from the subbase printed circuit board 40 to the main thermostat board 48 (see FIG. 4) (and eventually to the microcomputer on the main thermostat board 48 (see FIG. 4)) via the first means 42 for electrical communication and the second means 50 for electrical communication (see FIG. 4). The super capacitor 104 stores energy sufficient to retain the current time, the number of hours of operation of the unit, and the maximum and minimum temperature of the day, in addition to other information, in the memory of the electronic thermostat for 24 hours. It is not necessary to retain the first and second maximum temperatures, the first and second minimum temperatures or the beginning and ending time of the second time interval as these are all maintained by their respective slide positions during an extended power outage. Thus, if there is a power failure for less than 24 hours, the electronic thermostat 22 does not require reprogramming. All that need be done is to reset the current time. Additionally, because the energy to operate the memory is stored in a super capacitor 104 rather than a battery, it is not necessary to periodically ensure the storage means (either super capacitor 104 or battery) is operable. Further, there is no need to periodically replace batteries.

The display means 70 will flash the words "CHECK FILTER" with a fifty percent duty cycle if the fan 24 (see FIG. 1) accumulates 360 hours of running time. Thus, if the fan is "on" fifty percent of the time, the "CHECK FILTER" light will be displayed every thirty days. This visual indicator notifies the operator to check and/or replace the air filter, which may increase both the quality of the air in the predetermined area 10 and the efficiency of the energy used to heat or cool the predetermined area 10. If the operator depresses the thermostat cover 49 four times in rapid succession (less than 0.5 seconds between depressions), then the electronic thermostat 22 will reset the accumulated time of the "CHECK FILTER" to zero hours and will turn off the flashing display. The accumulated time cannot be inadvertently reset because the reset function is not operational if the "CHECK FILTER" prompt is not being displayed.

The display means 70 is responsive to the override means 68 and a system state slide (the "OFF"/"HEAT"/"COOL"/"AUTO" switch) 69. The compressor 13 (see FIG. 1) may have the capacity to serve two different settings (e.g., a full load and a half load). This can be accomplished, as is known to those of ordinary skill in the art, by utilizing a two speed compressor or two separate compressors. References to the "compressor" hereinabove and hereinafter refers to those compressors which can serve two different settings. The electronic thermostat 22 of the temperature control system (see FIG. 1) provides a method of displaying information on a display means 70 of an electronic thermostat 22 regarding remote parts (e.g., both compressor 13 and heating unit 14 of FIG. 1) of a temperature control system comprising the step of simultaneously manipulating an override means 68 and a system state slide 69. The diagnostic information regarding remote parts of the temperature control system can be easily displayed on the display means by simply: (1) sliding the system state slide 69 to "OFF"; (2) holding the override means 68 continually through step (6) in a depressed state; (3) sliding the system state slide 69 to the "HEAT" position, displaying the number of hours the furnace has run in the upper left and the number of cycles of the furnace in the lower left of the display means 70; (4) sliding the system state slide 69 to the "COOL" position, displaying the number of hours the first compressor has run in the upper left and the number of cycles of the first compressor in the lower left of the display means 70; (5) sliding the system state slide 69 to the "AUTO" position, displaying the number of hours the second compressor has run in the upper left and the number of cycles of the second compressor in the lower left of the display means 70; and (6) releasing the override means 68 and sliding the system state slide 69 to the desired position, resuming normal operation of the display means 70 and selecting the desired function for the system.

As seen in FIG. 2, a thermostat cover 49 is mounted on electronic thermostat 22. When the thermostat cover 49 is depressed against a display button 108 for one-half second or more, the LCD or display means 70 displays, in the following order, the current temperature set point, the maximum and minimum temperatures for both the first and second time intervals and the times at which the second time interval begins and ends. Next, normal display is resumed. The display button 108 delays operation one-half second before signaling the display means 70. Thus, inadvertently depressing the thermostat cover 49 will not display all of the above information.

As shown in FIG. 3, slides 84, 86, 94, 96, 72, and 74 are uniquely interconnected with slidable switches 190, 188, 194, 192, 198, and 196, respectively. Further, the system state slide 69 and the fan switch 71 are uniquely interconnected to slidable switches 202 and 200, respectively. All slidable switches 188, 190, 192, 194, 196, 198, 200, and 202 are mounted on the main thermostat board 48. Slidable switches 188 and 190 are disposed in a generally side by side relationship and are actuated by slide members 189 and 191, respectively, which comprise two of the six potentiometers 142 represented in FIG. 6. This arrangement prevents setting the highest desirable temperature lower than the lowest desirable temperature during the first time interval.

Figure 6:
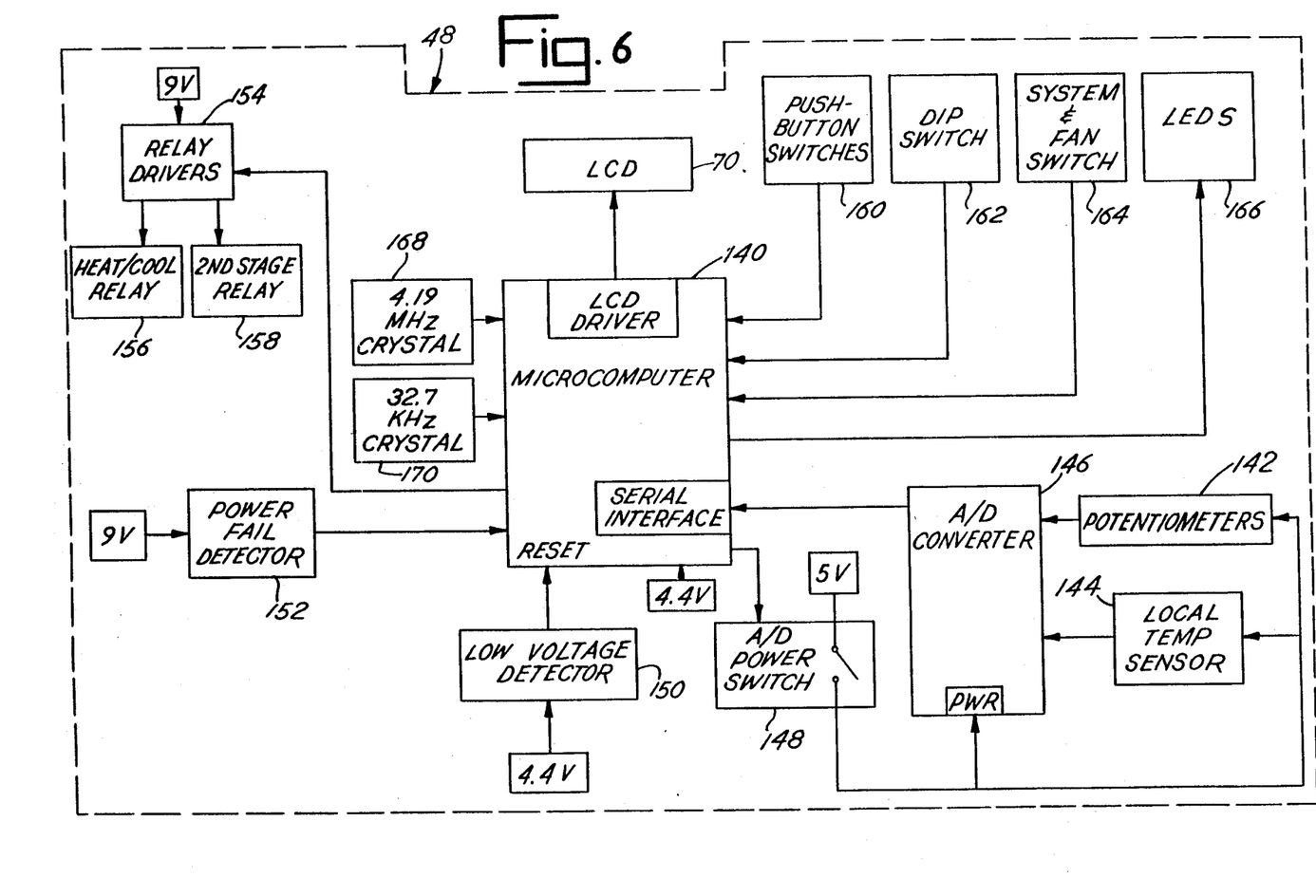
FIG. 6 is a schematic block diagram of a main thermostat board of the electronic thermostat made in accordance with the present invention.

Similarly, slidable switches 192 and 194 are disposed in a generally side by side relationship and are actuated by a slide members 193 and 195, respectively, which comprise two of the six potentiometers 142 represented in FIG. 6. This arrangement prevents setting the highest desirable temperature lower than the lowest desirable temperature during the second time interval.

Similarly, slidable switches 196 and 198 are disposed in a generally side by side relationship and are actuated by a slide members 197 and 199, respectively, which comprise two of the six potentiometers 142 represented in FIG. 6. This arrangement prevents setting the beginning time of the second time interval later than the ending time of the second time interval.

Thus, in the configuration shown, raising a slide corresponds to raising temperature whereas lowering a slide corresponds to lowering temperature. Also, as the slides are raised and lowered, the LCD 70 tracks and displays changing temperatures in increments of one degree Fahrenheit in order to alert the operator that the desired first maximum temperature, first minimum temperature, second maximum temperature or second minimum temperature has been reached.

A cover 43 of control panel 46 is attached to the housing means 38 by a set of prongs 206 on the cover 43 which cooperate with a set of apertures 208 on the housing means 38. Further, slidable switches 200 and 202 are actuated by slide members 201 and 203, respectively. Slide members 201 and 203 are connected to the fan switch 71 and the system slide switch 69, respectively. The fan switch 71 is shown schematically in FIG. 5 as "fan switch 138."

Referring to FIG. 5, the subbase printed circuit board 40 is comprised of super capacitor 104, over temperature shut off switch 120, relays and switches 122, 124, 136 and 138, rectifier bridges 126, voltage regulators 128, 130, triac trigger 132, and triac 134 all connected as shown. Preferably, voltage regulator 128 is comprised of a 9.0 volt voltage regulator and voltage regulator 130 is comprised of 5.0 volt and 4.4 voltage regulators. Turning to FIG. 6, the main thermostat board 48 is comprised of microcomputer 140, potentiometers 142 (one for each of slides 84, 86, 94, 96, 72, and 74 (see FIG. 2)), local temperature sensor 144, A/D converter 146, A/D converter power switch 148, low voltage detector 150, power failure detector 152, relay drivers 154, relays 156 and 158, switches 160, 162 and 164, LED's 166, and 4.19 megahertz and 32.7 kilohertz timing crystals, 168 and 170, respectively, connected as shown. The switch 162, preferably a dip switch, may comprise a plurality of on-off switches as desired to enable and disable selected algorithms or functions, e.g., to switch the output display from degrees fahrenheit to degrees centigrade, to select high or low cooling, or to enable the cancelling function for just the night period or both the day and night period.

Figure 7:
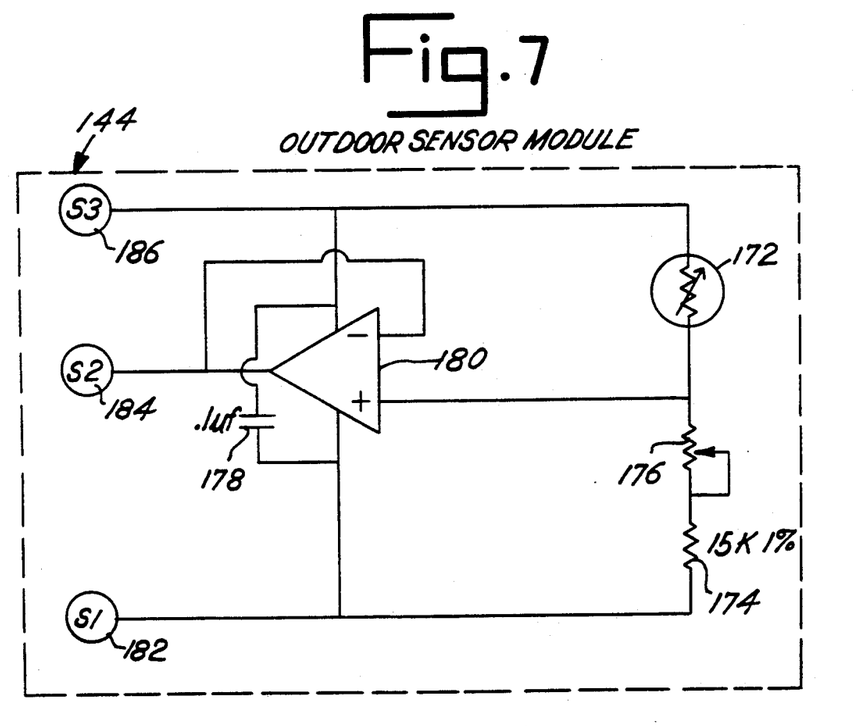
FIG. 7 is a schematic diagram of a local temperature sensor of the main thermostat board made in accordance with the present invention.

Referring to FIG. 7, the display means 70 (see FIG. 2) is also responsive to the local temperature sensor 144 (also referred to as an outdoor or ambient temperature sensor), which is comprised of a thermistor 172, a resistor 174, a potentiometer 176, a capacitor 178, an amplifier 180, and sensors S1 182, S2 184, and S3 186, all connected as shown. S2 184 is hard wired to the A/D converter 146 (see FIG. 6). S3 186 is electrically connected to all wires connecting the potentiometers 142 (see FIG. 6) and thermistor 172. S1 182 is electrically connected to all wires connecting the potentiometers 142 (see FIG. 6) and the resistor 174. In this configuration, the display means 70 (see FIG. 2) will alternate displaying the temperature of the predetermined area 10 (see FIG. 1) and the outdoor temperature. One can have the display means 70 (see FIG. 2) display only the temperature of the predetermined area 10 (see FIG. 1) by simply depressing the "SYSTEM" (or control) button 82 (see FIG. 2). Depressing the "SYSTEM" button 82 a second time will bring the display means 70 (see FIG. 2) back to the normal mode of alternating displays. Thus, toggling the "SYSTEM" button changes whether the display means displays the current outdoor temperature.

There has been provided by the present invention a unique electronic thermostat 22 that can be intuitively operated to control the temperature in a predetermined area 10 to be conditioned. The present invention provides many features including intuitive controls, diagnostic information, and a feature which renders the electronic thermostat maintenance free.

The invention has been described in detail with particular reference to an illustrative preferred embodiment thereof, but it will be understood that variations and modifications can be effected within the spirit and scope of the invention as described hereinabove and as defined in the appended claims.

What is claimed is:

1. An electronic thermostat for controlling the temperature of a predetermined area comprising:
    a first pair of slide means for controlling the temperature of the predetermined area during a first time interval;
    a second pair of slide means for controlling the temperature of the predetermined area during a second time interval; and
    a third pair of slide means for controlling a beginning time and an ending time of the second time interval whereby the first time interval and the second time interval consist essentially of a 24 hour period and the temperature of the predetermined area is determined by the position of the first pair of slide means during the first time interval and the temperature of the predetermined area is determined by the position of the second pair of slide means during the second time interval.

2. The apparatus of claim 1 wherein the electronic thermostat further comprises an override means for enabling the temperature of the predetermined area to be determined by the position of the first pair of slide means during the second time interval and for enabling the temperature of the predetermined area to be determined by the position of the second pair of slide means during the first time interval.

3. The apparatus of claim 1 wherein the electronic thermostat further comprises indicator means for specifying whether the temperature of the predetermined area is being controlled by the position of the first pair of slide means or the second pair of slide means.

4. The apparatus of claim 1 wherein the first pair of slide means is comprised of a cool slide and a heat slide, the cool slide and the heat slide being slidably attached to a first path having a first end and a second end, the cool slide being closer than the heat slide to the first end of the first path at all times.

5. The apparatus of claim 1 wherein the second pair of slide means is comprised of a cool slide and a heat slide, the cool slide and the heat slide being slidably attached to a second path having a first end and a second end, the cool slide being closer than the heat slide to the first end of the second path at all times.

6. The apparatus of claim 1 wherein the third pair of slide means is comprised of a begin slide and an end slide, the begin slide and the end slide being slidably attached to a third path having a first end and a second end, the begin slide being closer than the end slide to the first end of the third path at all times.

7. The apparatus of claim 1 further comprising a capacitor for supplying power to a memory portion of the electronic thermostat for a predetermined period of time in the event of a power failure.

8. The apparatus of claim 4 wherein the cool slide is electronically connected to a main thermostat board whereby the electronic thermostat will lower the temperature of the predetermined area when the current temperature is greater than the desired temperature as set by the cool slide and the time is within the first time interval.

9. The apparatus of claim 4 wherein the heat slide is electronically connected to a main thermostat board whereby the electronic thermostat will raise the temperature of the predetermined area when the current temperature is less than the desired temperature as set by the heat slide and the time is within the first time interval.

10. The apparatus of claim 5 wherein the cool slide is electronically connected to a main thermostat board whereby the electronic thermostat will lower the temperature of the predetermined area when the current temperature is greater than the desired temperature as set by the cool slide and the time is within the second time interval.

11. The apparatus of claim 5 wherein the heat slide is electronically connected to a main thermostat board whereby the electronic thermostat will raise the temperature of the predetermined area when the current temperature is less than the desired temperature as set by the heat slide and the time is within the second time interval.

12. The apparatus of claim 6 wherein the begin slide and the end slide are electronically connected to a main thermostat board whereby the electronic thermostat will adjust the temperature of the predetermined area according to the position of the second pair of slide means when the current time is later than the time set by the begin slide and prior to the time set by the end slide.

13. An electronic thermostat for controlling the temperature of a predetermined area comprising:
a housing means, the housing means comprises a thermostat and a subbase;
the subbase further comprises a subbase board, a first means for electrical communication, and a first means for mechanical coupling;
the thermostat further comprises a control panel, a main thermostat board, a thermostat cover, a second means for electrical communication, and a second means for mechanical coupling, the second means for electrical communication being electrically connected to the first means for electrical communication and the second means for mechanical coupling being connected to the first means for mechanical coupling;

the control panel further comprises a first pair of slide means arranged in an essentially linear manner, a second pair of slide means arranged in an essentially linear manner, and a third pair of slide means arranged in an essentially linear manner, the first pair of slide means further comprises a cool slide means and a heat slide means, both of which are electronically connected to the main thermostat board, the second pair of slide means further comprises a cool slide means and a heat slide means, both of which are electronically connected to the main thermostat board, and the third pair of slide means further comprises a begin slide and an end slide, both of which are electronically connected to the main thermostat board, whereby the third pair of slide means can be moved to set a second time interval in which the position of the second pair of slide means controls the temperature of the predetermined area, the third pair of slide means also essentially defining a first time interval as the time of day which is not occupied by the second time interval, in which the position of the first pair of slide means controls the temperature of the predetermined area.

14. The apparatus as claimed in claim 13 wherein the main thermostat board further comprises a display means which is responsive to the first pair of slide means, the second pair of slide means, and the third pair of slide means.

15. The apparatus as claimed in claim 13 wherein the main thermostat board further comprises a display means which is responsive to a fan running for a predetermined amount of time, both the display means and an accumulated fan running time being resettable via the control panel.

16. The apparatus as claimed in claim 13 wherein the display means is further comprised of an LCD.

17. The apparatus as claimed in claim 14 including a display button in circuit with the display means, the thermostat cover cooperating with the display button for selectively displaying the settings of the first pair of slide means, the second pair of slide means, the third pair of slide means, and the current temperature the electronic thermostat is trying to achieve for the predetermined area.

18. The apparatus as claimed in claim 17 including an ambient temperature sensor operatively connected to the display means, whereby actuation of the display button will also display the high and low ambient temperature of the day.

19. A method of controlling the temperature of a predetermined area via an electronic thermostat comprising the steps of:
sliding a first pair of slide means for controlling the temperature of the predetermined area during a first time interval;
sliding a second pair of slide means for controlling the temperature of the predetermined area during a second time interval; and
sliding a third pair of slide means for controlling a beginning time and an ending time of the second time interval.

20. The method of claim 19 further comprising the step of toggling an override means for enabling the temperature of the predetermined area to be determined by the position of the first pair of slide means during the second time interval and for enabling the temperature of the predetermined area to be determined by the position of the second pair of slide means during the first time interval.

* * * * *